Oct. 26, 1943.  J. E. CLICKNER  2,332,893

UNIVERSAL TUBE FITTING

Filed May 7, 1942

INVENTOR.
JAMES E. CLICKNER
BY
ATTORNEY

Patented Oct. 26, 1943

2,332,893

UNITED STATES PATENT OFFICE 2,332,893

UNIVERSAL TUBE FITTING

James E. Clickner, Dearborn, Mich., assignor to The Flex-O-Tube Company, a corporation of Delaware Application May 7, 1942, Serial No. 442,038

1 Claim. (Cl. 285—90)

This invention relates to universal tubing fittings of the type which admits of universal movement between the flared tubing and the fitting, and to the method of manufacturing and assembling the same.

When semi-rigid or rigid tubing is employed to make connections between elements and units of a power plant or the like which is subject to vibrational movement and when semi-rigid or rigid tubing is subject to universal movement with respect to the structure to which it is connected, a fitting which will admit of universal movement between the fitting and the rigid or semi-rigid tubing which is fluid tight and which will withstand vibration is required. A fitting of the type which meets the hereinbefore stated requirements and over which the instant invention is an improvement is disclosed and claimed in Patent No. 2,273,395 entitled Universal tubing fitting, issued February 17, 1942, to Norman M. Couty of Detroit, Michigan, assignor to The Flex-O-Tube Company, a corporation of Michigan.

With the foregoing in view, one object of the invention is to provide an improved universal tubing fitting which is simple in construction, inexpensive to manufacture and which does not create, during assembly, initial torsional deformation of the resilient washer employed.

Another object of the invention is to provide an improved universal tubing fitting wherein the resilient washer employed is protected against being fouled by foreign matter and shielded against atmospheric deterioration.

Another object of the invention is to provide an improved universal tubing fitting in which the tubing connected to the fitting may be flexed with greater freedom over a greater range of movement with respect to the fitting than heretofore was possible without leakage and without undue and destructive stresses being set up in the washer.

A further object of the invention is to provide an improved, simple and economical method of manufacturing universal tubing fittings of the class described.

Other objects of the invention will become apparent by reference to the following detailed description taken in connection with the accompanying drawing, in which.

Figure 1:
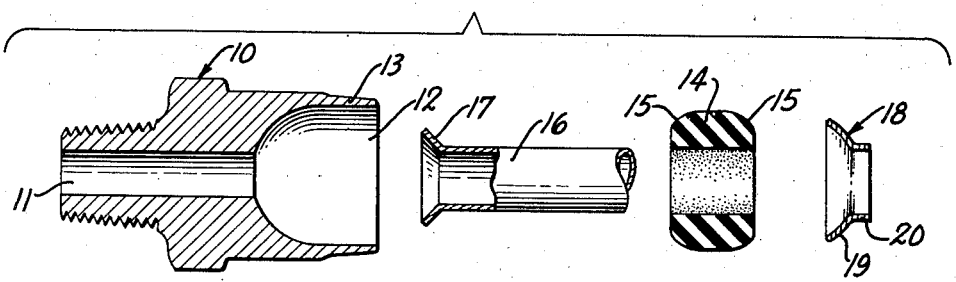
Fig. 1 is an exploded longitudinal sectional view of a universal flexible connection for tubing embodying the invention.

Referring now to the drawing wherein like numerals refer to like and corresponding parts throughout the several views, the illustrative embodiment of the invention disclosed in the drawing is shown in conjunction with a male externally threaded pipe fitting, however, it is to be understood that the invention may be used with and applied to various other types of pipe fittings and couplings as may be desired.

Figure 2:
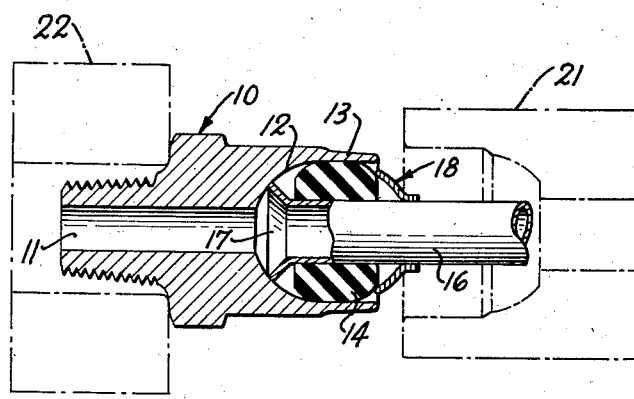
Fig. 2 is a longitudinal sectional view of the flexible connection for tubing disclosed in Fig. 1 partially asembled and positioned in dies ready for the final assembly operation.
Figures 3, 4:
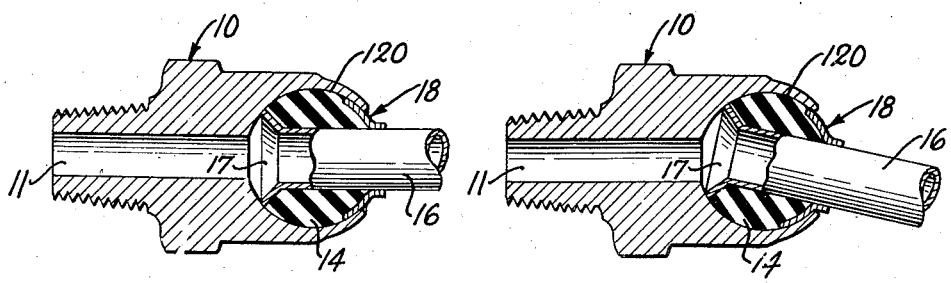
Fig. 3 is a longitudinal sectional view of a completely assembled flexible connection for tubing embodying the invention.
Fig. 4 shows a longitudinal sectional view of the flexible connection for tubing disclosed in Figs. 1, 2 and 3 showing the tubing in an extreme flexed position.

Referring now particularly to Figs. 1, 2 and 3, the illustrative embodiment of the invention disclosed therein comprises an externally threaded pipe fitting 10 provided with an axial bore 11 therethrough terminating in an axially disposed frusto-spherically bottomed counterbore 12 formed in the extended enlarged end of the said fitting 10 which is so formed as to provide an axially disposed annular lip 13 which later is formed into a spherical extension 120 of the frusto-spherical bottom of the counterbore 12.

A relatively stiff yet resilient annular washer 14 of rubber, neoprene, Duprene, or the like having its outer peripheral corners rounded as indicated by the numeral 15 in Fig. 1 and having an internal diameter preferably slightly less than the external diameter of the flared tubing 16 is telescoped over the said flared tubing 16. The said washer 14 is of sufficient length to fill the cavity defined by the counterbore 12 when formed into a spherical shape 120 around the flared end 17 of the flared tubing 16 as later described.

A domed shaped washer 18 having a domed portion 12 and an annular collar 20 is telescoped over the flared tubing 16 and brought into position against and overlapping the rounded peripheral corner 15 at one end of the resilient washer 14 as indicated in Fig. 2. The outer surface of the domed portion 12 of the domed shaped washer 18 is formed to the same spherical dimension as the frusto-spherical bottom of the counterbore 12 of the fitting 10.

When the elements 10, 14 and 18 of the flexible connection are assembled in relationship to the flared end 17 of the flared tubing 16 as indicated in Fig. 2, the fitting 10 is pressed into a female forming die 21 by the male die 22 whereupon the axially disposed annular lips 13 are formed into a frusto-spherical shape 120 making, together with the domed shaped washer 18, a spherical housing for the flared end 17 of the flared tubing 16 simultaneously with pressing the said resilient washer 14 into sealed relationship with respect to the flared tubing 16, the fitting 10, and the dome shaped washer 18; thus providing a fluid tight yet resilient universal flexible connection for tubing.

It is preferable that the inner surface of the counterbore 12 and the outer surface of the domed portion 19 of the dome shaped washer 18 be finished smooth or polished and that all burs be removed from the annular edges of the pipe fitting 10 and dome 19 of the dome shaped washer 18 before assembly to admit of freedom of universal movement of the flared tubing 16 with respect to the fitting 10.

Although but one embodiment of the invention and a single method of producing the same has been disclosed and described in detail, it is obvious that many changes may be made in the size, shape, arrangement, and details of the elements of the invention may be changed and that the method steps may be modified without departing from the spirit and scope of the invention as defined by the appended claim.

I claim:

In combination, a cylindrical tube, an outwardly directed annular flange on one end of said tube, a resilient annular packing member embracing the cylindrical portion of said tube and abutting said flange, a dome-shaped washer fitting on the cylindrical portion of said tube and abutting that end of said packing member opposite said flange, and a one-piece tubular coupling member having a partially spherical recess therein the walls of which exteriorly embrace said flange, dome-shaped washer and packing member, said tube having a limited amount of universal movement in said coupling member about the center of said partially spherical recess.

JAMES E. CLICKNER.